(12) United States Patent
Guest

(10) Patent No.: US 8,551,274 B2
(45) Date of Patent: Oct. 8, 2013

(54) PERMEABLE MATERIAL COMPACTING METHOD

(71) Applicant: Randall V. Guest, Spring, TX (US)

(72) Inventor: Randall V. Guest, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 13/688,927

(22) Filed: Nov. 29, 2012

(65) Prior Publication Data

US 2013/0081755 A1 Apr. 4, 2013

Related U.S. Application Data

(62) Division of application No. 13/204,335, filed on Aug. 5, 2011.

(51) Int. Cl.
*B65H 81/00* (2006.01)

(52) U.S. Cl.
USPC ........... 156/195; 156/187; 156/188; 156/191; 156/192; 156/429; 100/41

(58) Field of Classification Search
USPC ................ 156/184, 185, 187, 188, 190–192, 156/194, 195, 425, 428–432, 443, 446–450, 156/458; 100/41
See application file for complete search history.

(56) References Cited

U.S. PATENT DOCUMENTS

| | | | |
|---|---|---|---|
| 3,399,095 A * | 8/1968 | Hyland, Jr. | 156/79 |
| 3,533,416 A * | 10/1970 | Brooks et al. | 131/342 |
| 3,873,396 A | 3/1975 | Rice | |
| 4,213,031 A | 7/1980 | Farber | |
| 4,358,064 A | 11/1982 | Garneau | |
| 4,474,845 A | 10/1984 | Hagerman et al. | |
| 5,451,287 A | 9/1995 | Marty | |
| 5,798,019 A * | 8/1998 | Cushner et al. | 156/425 |
| 5,827,430 A * | 10/1998 | Perry et al. | 210/497.01 |

FOREIGN PATENT DOCUMENTS

| EP | 0177167 A1 | 4/1986 |
|---|---|---|
| EP | 354546 A2 * | 2/1990 |

OTHER PUBLICATIONS

Nick Carrejo et al., "Shape Memory Polymer as a Sand Management Alternative to Gravel Packing"; Canadian Society for Unconventional Gas/Society of Petroleum Engineers, CSUG/SPE Paper No. 147101; Nov. 15, 2011; pp. 1-13.
N. Carrejo et al., "The Effects of Dynamic Loading on the Sand Management and Permeability of Shape Memory Polymer and Gravel Packs for Sand Management Applications"; Society of Petroleum Engineers, SPE Paper No. 143060, Jun. 14, 2011, pp. 1-9.
Y. Yuan et al., "In-Situ Mechanical and Functional Behavior of Shape Memory Polymer for Sand Management Applications"; Society of Petroleum Engineers, SPE Paper No. 143204, Jun. 14, 2011, pp. 1-10.
Notification of Transmittal of the International Search Report and the Written Opinion of the International Searching Authority; PCT/US2012/048794; Mailed Feb. 14, 2013; Korean Intellectual Property Office; 8 pages.

* cited by examiner

*Primary Examiner* — Katarzyna Wyrozebski Lee
*Assistant Examiner* — Carson Gross
(74) *Attorney, Agent, or Firm* — Cantor Colburn LLP

(57) ABSTRACT

A permeable material compacting method includes, feeding permeable material between at least one set of rollers, decreasing a thickness of the permeable material, and wrapping the permeable material around a mandrel in a helical fashion.

8 Claims, 4 Drawing Sheets

PERMEABLE MATERIAL COMPACTING METHOD

CROSS-REFERENCE TO RELATED APPLICATION

This application is a divisional application of U.S. patent application Ser. No. 13/204,335 filed Aug. 5, 2011, the entire contents of which are incorporated herein by reference.

BACKGROUND

Gravel packing is a process used in the downhole industry to fill an annulus with gravel. Gravel packed by such a process is permeable to fluid while providing support to walls of a wellbore in an earth formation, for example. The support prevents erosion and other damage to the formation walls that could result if the gravel support were not present. Recent developments replace the gravel pack with permeable space conforming materials that can expand to fill an annulus after being deployed therein. Such materials, as those described in U.S. Pat. No. 7,828,055 granted to Willauer et al. on Nov. 9, 2010, in U.S. Pat. No. 5,049,591 granted to Kaisha on Sep. 17, 1991 and methods as described in U.S. Pat. No. 7,644,773 granted to Richard on Jan. 12, 2010, the entire contents of which are incorporated herein by reference, require compaction or compression prior to being deployed. Methods and systems for compacting such materials are well received in the art.

BRIEF DESCRIPTION

Disclosed herein is a permeable material compacting method. The method includes, feeding permeable material between at least one set of rollers, decreasing a thickness of the permeable material, and wrapping the permeable material around a mandrel in a helical fashion.

Further disclosed herein is a permeable material compacting apparatus. The apparatus includes, a mandrel, and at least one set of rollers having rotational axes parallel to one another, and having surfaces defining a minimum dimension therebetween configured to compact permeable material rolled therebetween to a thickness of the minimum dimension, the rotational axes are skewed relative to an axis of the mandrel such that permeable material compacted by the at least one set of rollers is windable onto the mandrel in a helical fashion.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
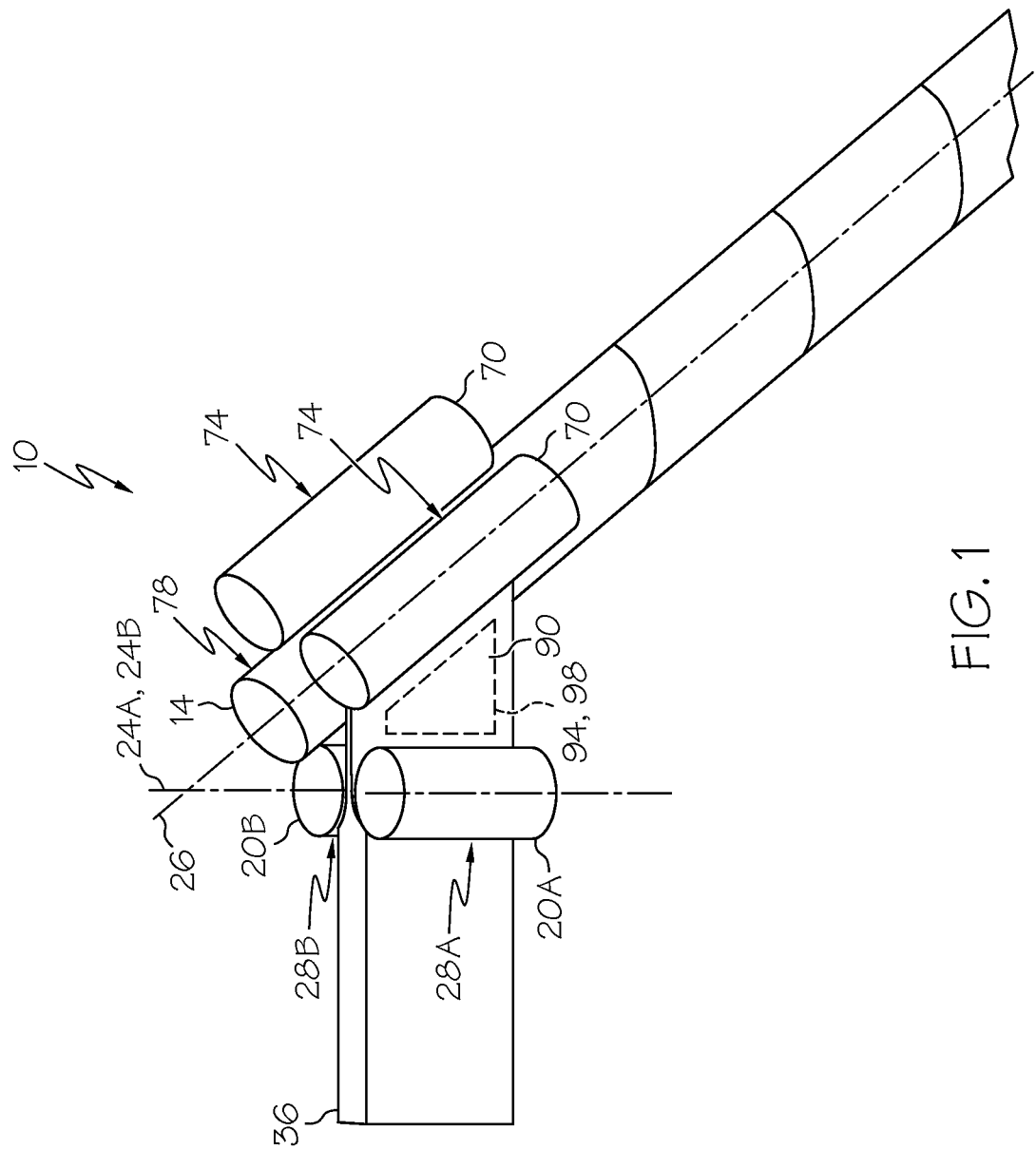
FIG. 1 depicts a perspective view of a permeable material compacting apparatus disclosed herein.
Figure 2:
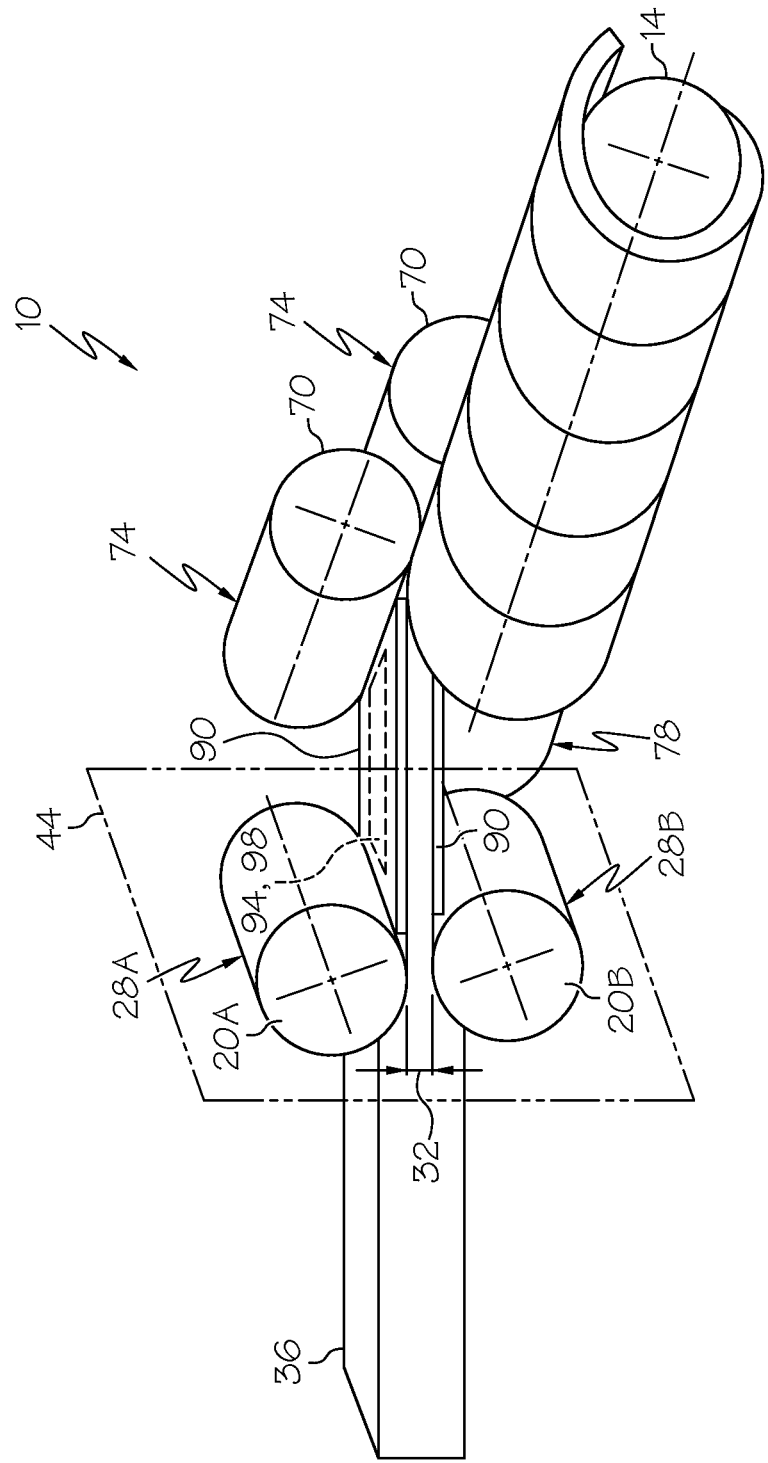
FIG. 2 depicts an alternate perspective view of the permeable material compacting apparatus of FIG. 1.
Figure 3:
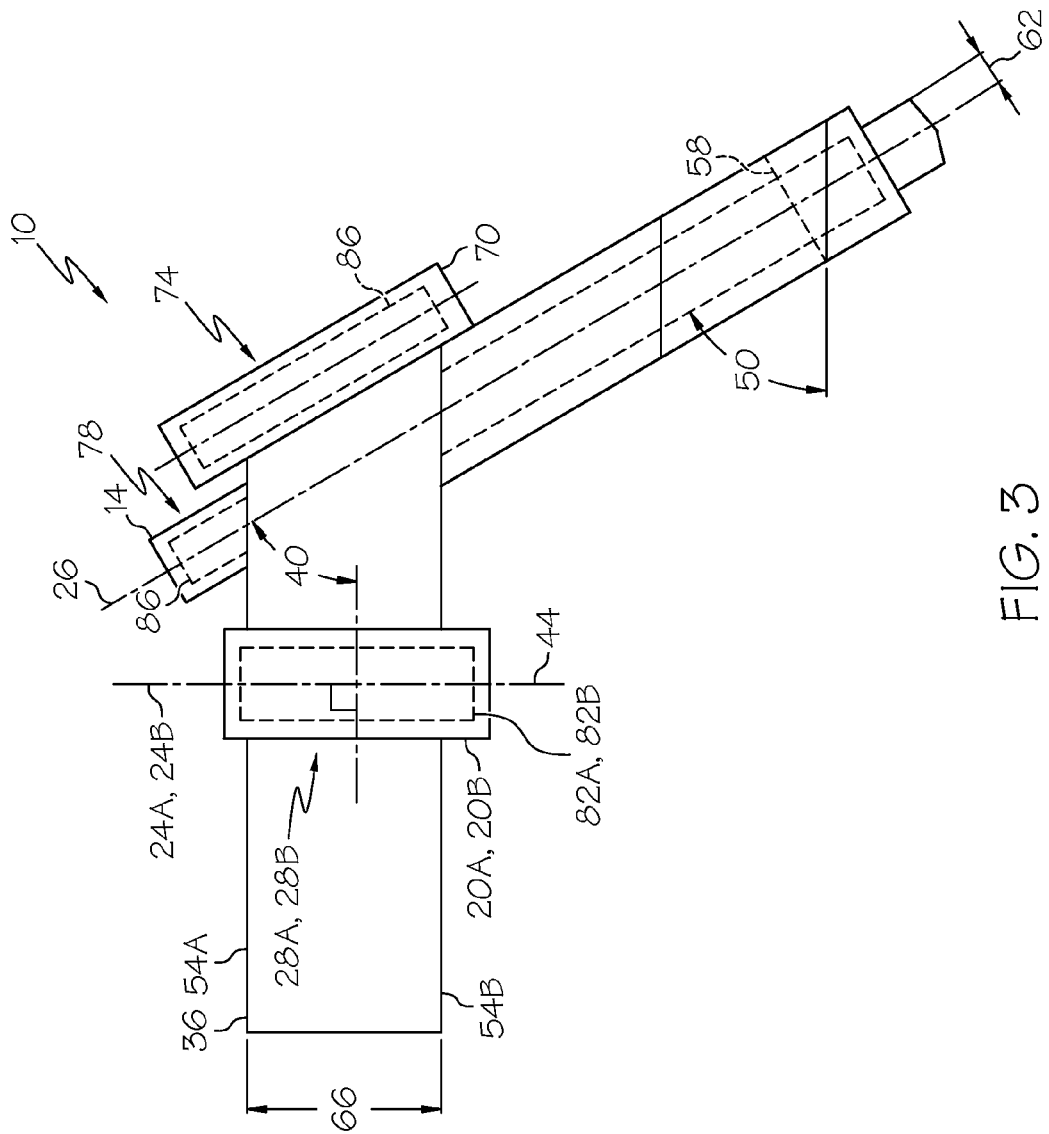
FIG. 3 depicts a top view of the permeable material compacting apparatus of FIG. 1.

Referring to FIGS. 1 through 3, an embodiment of a permeable material compacting apparatus disclosed herein is illustrated at 10. The compacting apparatus 10 includes, a mandrel 14, and at least one set of rollers 20 (with a single set being shown herein), with each roller 20A, 20B of the set of rollers 20 having axes 24A, 24B, respectively that are parallel to one another but skewed relative to an axis 26 of the mandrel 14. Each roller 20A, 20B of the set of rollers 20 also have surfaces 28A, 28B, respectively, that define a minimum dimension 32 therebetween. The rollers 20A, 20B are configured to compact at least one layer of permeable material 36 rolled therebetween to a thickness substantially equal to the minimum dimension 32. The axes 24A, 24B are skewed relative to the axis 26 of the mandrel 14 such that permeable material compacted by the rollers 20A, 20B is windable onto the mandrel 14 in a helical fashion. An angle 40 between the normal to a plane 44 including the two axes 24A and 24B and the axis 26 defines a helix angle 50 shown herein between an edge 54A of the permeable material 36 the axis 26 of the mandrel 14.

The helix angle 50, a radial dimension 62 of the mandrel 14 and a width 66 of the permeable material 36 are selected to assure opposing edges 54A and 54B of the permeable material 36 abut one another when helically wrapped around the mandrel 14.

Additionally, one or more second rollers 70, with two being illustrated in the Figures, can facilitate aligning the permeable material 36 to the mandrel 14 as well as again compressing the permeable material 36 between surfaces 74 thereon and a surface 78 of the mandrel 14.

Figure 4:
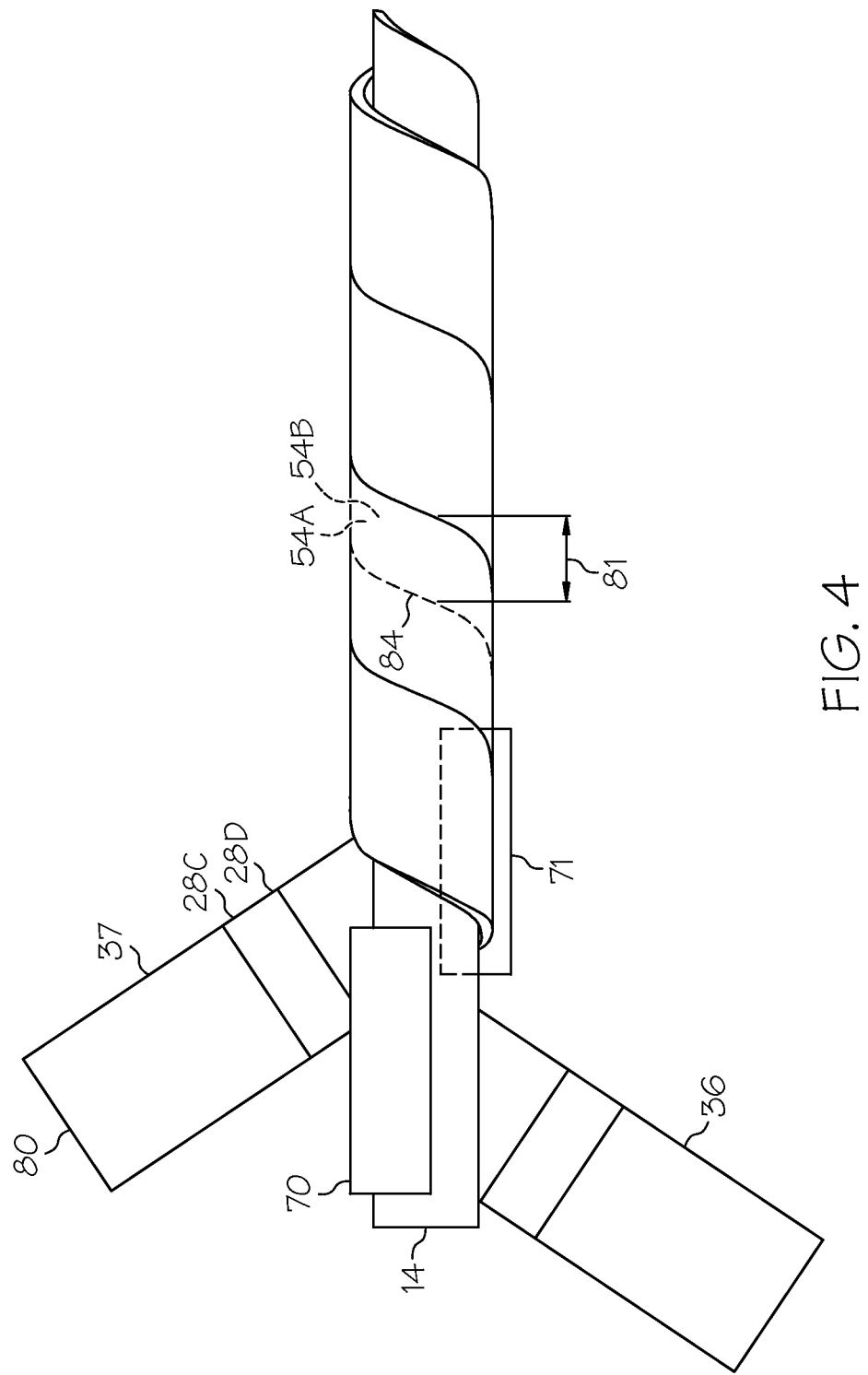
FIG. 4 depicts an alternate embodiment of a permeable material compacting apparatus disclosed herein.

Also, with specific reference to FIG. 4, at least a second application of the permeable material 37 may be made using at least one other stream 80 of the permeable material 37, set of rollers 28C and 28D, and second roller 71. The second layer would be offset along the axis of mandrel 14 by a selected dimension 81, such as half the width of the permeable material 37 divided by the sine of the helix angle 50, so that a centerline 84 of the second layer falls roughly over the edges 54A and 54B of the previously placed permeable material 36. Any three or more layers would be offset according to design requirements.

In addition to compacting the permeable material 36 the rollers 20A, 20B, the second rollers 70, and the mandrel 14 can aid in altering temperatures of the permeable material 36. It should be understood that the term permeable material as used herein covers any material that could serve as a filter to remove unwanted particulates from fluid passing therethrough. This filtration can be via flow through pores, cells or interstices, for example and as such, materials employable as the permeable material 36 include porous or cellular materials as well as membranes, mats and foams. Additionally, it has been found that for some permeable materials heating the permeable material 36 prior to compaction, and cooling the permeable material 36 subsequent to compaction, can aid in increasing the percentage of volume reduction of the permeable material 36 that can be maintained, and that can be recovered at a later time.

To take advantage of these characteristics the rollers 20A, 20B, of embodiments disclosed herein, include heaters 82A, 82B that can increase temperatures of the permeable material 36 while it is in contact with the rollers 20A, 20B and while it is being compacted therebetween. Similarly, the mandrel 14 and the second rollers 70 include coolers 86 that can decrease temperatures of the permeable material 36 while it is in contact with the mandrel 14 and the second rollers 70. As such, temperatures of the permeable material 36 can be adjusted before and after compaction.

While some materials usable as the permeable material 36 are preferably heated before compaction and cooled after, as discussed above, for other materials the heating and cooling order are reversed. Some high-loft materials, as initially assembled, are largely void. High-loft fiber mat, for example, in order to serve its purpose when employed in a downhole conformable screen application must be consolidated or compacted into a more dense layer. Additionally, some materials, while held in the consolidated or compacted arrangement require that the temperature of the fiber be raised to a determined temperature. Such materials are sometimes referred to as heat fusible mats. These materials may be compacted while cold, and then heated to a determined temperature to fuse them. As such, embodiments of the compacting apparatus could have the heaters 82A, 82B and coolers 86 swapped between the receptive hosts to achieve the appropriate temporal changes in temperature relative to when the permeable material 36 is compacted.

In addition to the rollers 20A, 20B, the mandrel 14 and the second rollers 70 providing heating and/or cooling, restraining members 90, shown herein as plates, can also aid in transferring heat to and from the permeable material 36. Additional heaters 94 and/or coolers 98 in functional engagement with the restraining members 90 can provide this desired effect. Additionally, the restraining members 90 may be selectively positioned apart from one another by the minimum dimension 32 to help maintain the permeable material 36 at that same thickness while moving from between the set of rollers 20 to the mandrel 14.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed:

1. A permeable material compacting method comprising:
   feeding permeable material between at least one set of rollers;
   compacting the permeable material between the at least one set of rollers thereby decreasing a thickness of the permeable material;
   maintaining the thickness of the permeable material with restraining plates positioned between the at least one set of rollers and a mandrel; and
   wrapping the permeable material around the mandrel in a helical fashion.

2. The permeable material compacting method of claim 1, further comprising heating the permeable material.

3. The permeable material compacting method of claim 1, further comprising cooling the permeable material.

4. The permeable material compacting method of claim 1, further comprising heating the at least one set of rollers.

5. The permeable material compacting method of claim 1, further comprising cooling the mandrel.

6. The permeable material compacting method of claim 1, further comprising compacting the permeable material between the mandrel and at least one second roller.

7. The permeable material compacting method of claim 1, further comprising abutting opposing edges of the permeable material as it is helically wrapped around the mandrel.

8. The permeable material compacting method of claim 1, further comprising:
   feeding a second stream of permeable material between at least one second set of rollers;
   decreasing a thickness of the permeable material of the second stream; and
   wrapping the second stream of the permeable material around the mandrel in a helical fashion radially outwardly of a first stream of the permeable material.

* * * * *